(12) United States Patent
Leto

(10) Patent No.: US 6,330,948 B1
(45) Date of Patent: Dec. 18, 2001

(54) STABLE RACK FOR DISH WASHING SCRUBBERS

(76) Inventor: Alfonso Leto, 1602 Hatfield Dr., Franklin, TN (US) 37064

( * ) Notice: Subject to any disclaimer, the term of this patent is extended or adjusted under 35 U.S.C. 154(b) by 0 days.

(21) Appl. No.: 09/400,045

(22) Filed: Sep. 21, 1999

(51) Int. Cl.⁷ .................................................. A47F 7/00
(52) U.S. Cl. ...................... 211/70.6; 248/206.3; 211/65
(58) Field of Search ................ 211/70.6, 85.12, 211/119.009, 181.1, 85.25, 85.31, 65; 248/205.5, 206.2–206.4, 309.1, 309.3, 311.2; D6/566, 524–525, 553

(56) References Cited

U.S. PATENT DOCUMENTS

| Re. 21,391 | * | 3/1940 | Holden | 248/309.1 |
| D. 262,257 | | 12/1981 | Sohn . | |
| D. 313,123 | * | 12/1990 | Hayes | D9/337 |
| D. 354,873 | | 1/1995 | Odbert . | |
| D. 376,941 | | 12/1996 | Munoz . | |
| 1,694,235 | * | 12/1928 | Schoenfelder | 248/206.2 |
| 2,051,847 | * | 8/1936 | Halstead | 248/206.3 |
| 2,315,566 | * | 4/1943 | Waltral et al. | 211/123 |
| 2,612,273 | * | 9/1952 | Smith | 211/119.009 |
| 3,186,671 | * | 6/1965 | Standley | 248/206.2 |
| 3,508,691 | * | 4/1970 | Langbehn . | |
| 3,568,969 | * | 3/1971 | Boman | 211/181.1 |
| 4,133,432 | * | 1/1979 | Den Blaker | 211/181.1 |
| 4,324,381 | * | 4/1982 | Morris | 248/311.2 |
| 4,696,447 | * | 9/1987 | Strecker | 248/206.3 |
| 4,779,829 | * | 10/1988 | Rocke et al. | 248/206.2 |
| 4,830,198 | | 5/1989 | Colquitt . | |
| 4,850,556 | * | 7/1989 | Otani et al. | 248/206.2 |
| 4,979,708 | * | 12/1990 | Aoki | 248/206.2 |
| 4,984,693 | * | 1/1991 | Belokin, Jr. et al. | 211/85.31 |
| 5,039,046 | * | 8/1991 | Brewster | 248/206.3 |
| 5,046,623 | | 9/1991 | Tackac . | |
| 5,114,106 | * | 5/1992 | Daughtery et al. | 248/206.4 |
| 5,217,123 | | 6/1993 | Riley . | |
| 5,232,189 | * | 8/1993 | Koch | 248/309.1 |
| 5,313,337 | * | 5/1994 | Byers | 248/206.3 |
| 5,348,168 | | 9/1994 | Emery . | |
| 5,678,793 | * | 10/1997 | Hill | 248/206.3 |
| 5,715,876 | * | 2/1998 | Burt | 248/309.3 |
| 5,839,632 | * | 11/1998 | Koday | 248/311.2 |
| 5,865,325 | * | 2/1999 | Comstock | 211/181.1 |
| 5,984,251 | * | 11/1999 | Davis | 248/311.2 |
| 6,131,865 | * | 10/2000 | Adams | 248/206.2 |

* cited by examiner

Primary Examiner—Daniel P. Stodola
Assistant Examiner—Jennifer E. Novosad

(57) ABSTRACT

A stable rack for use at a sink suited for holding a kitchen implement, particularly a dish washing scrubber. The rack includes a frame having a cradle on one side for holding the implement, and on the other side, one or more arms to hook over the flange of the sink to suspend the rack on the sink wall. On the same side of the frame, are a suction cup for securing the rack to the wall of the sink, and one or more stabilizer feet for pressing against the sink wall to prevent the rack from rocking on its mounting.

4 Claims, 8 Drawing Sheets

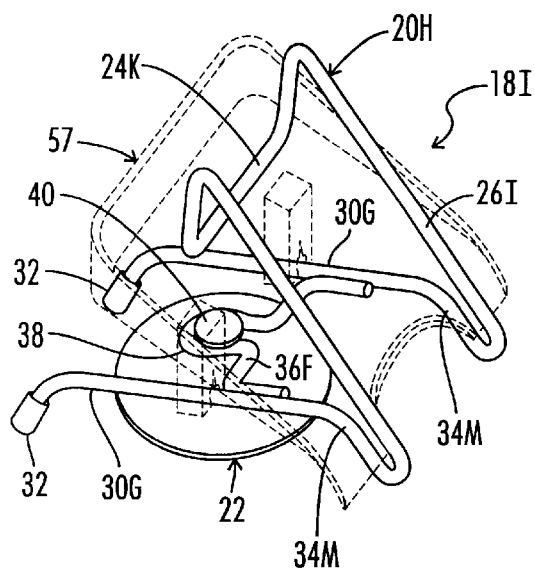
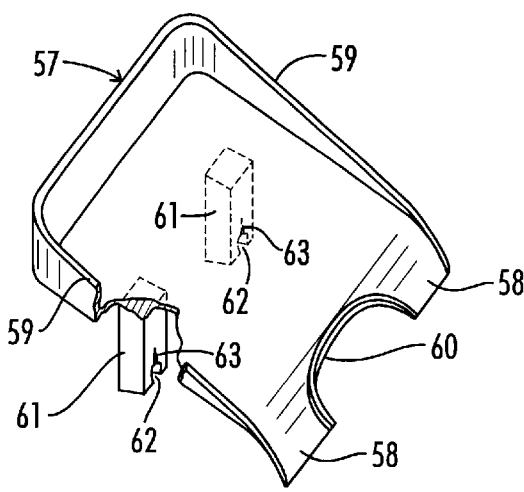
FIG. 3          FIG. 3A
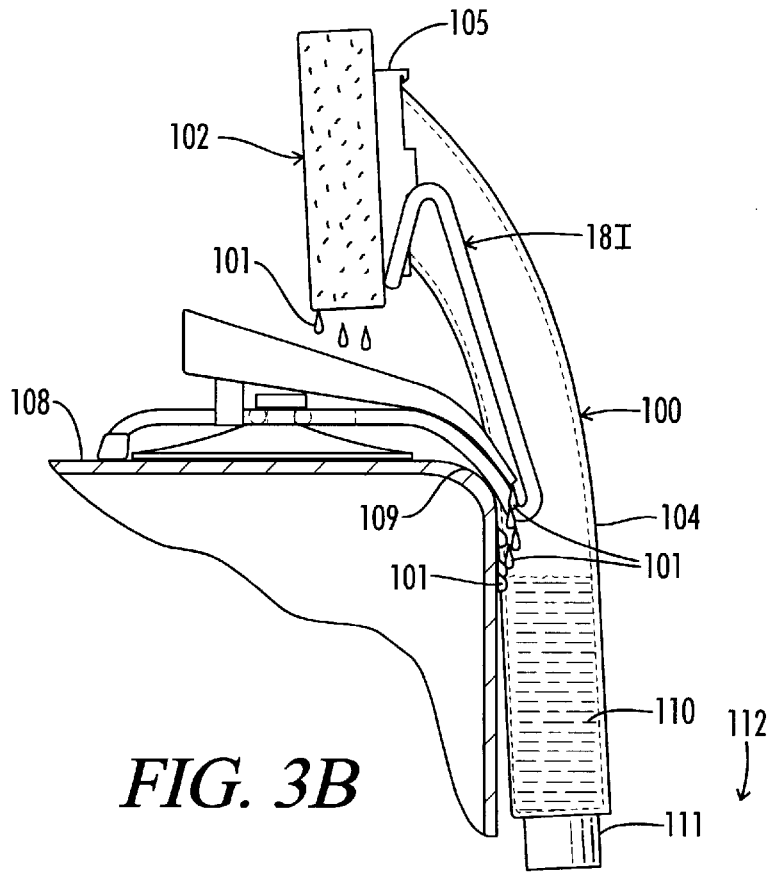
FIG. 3B

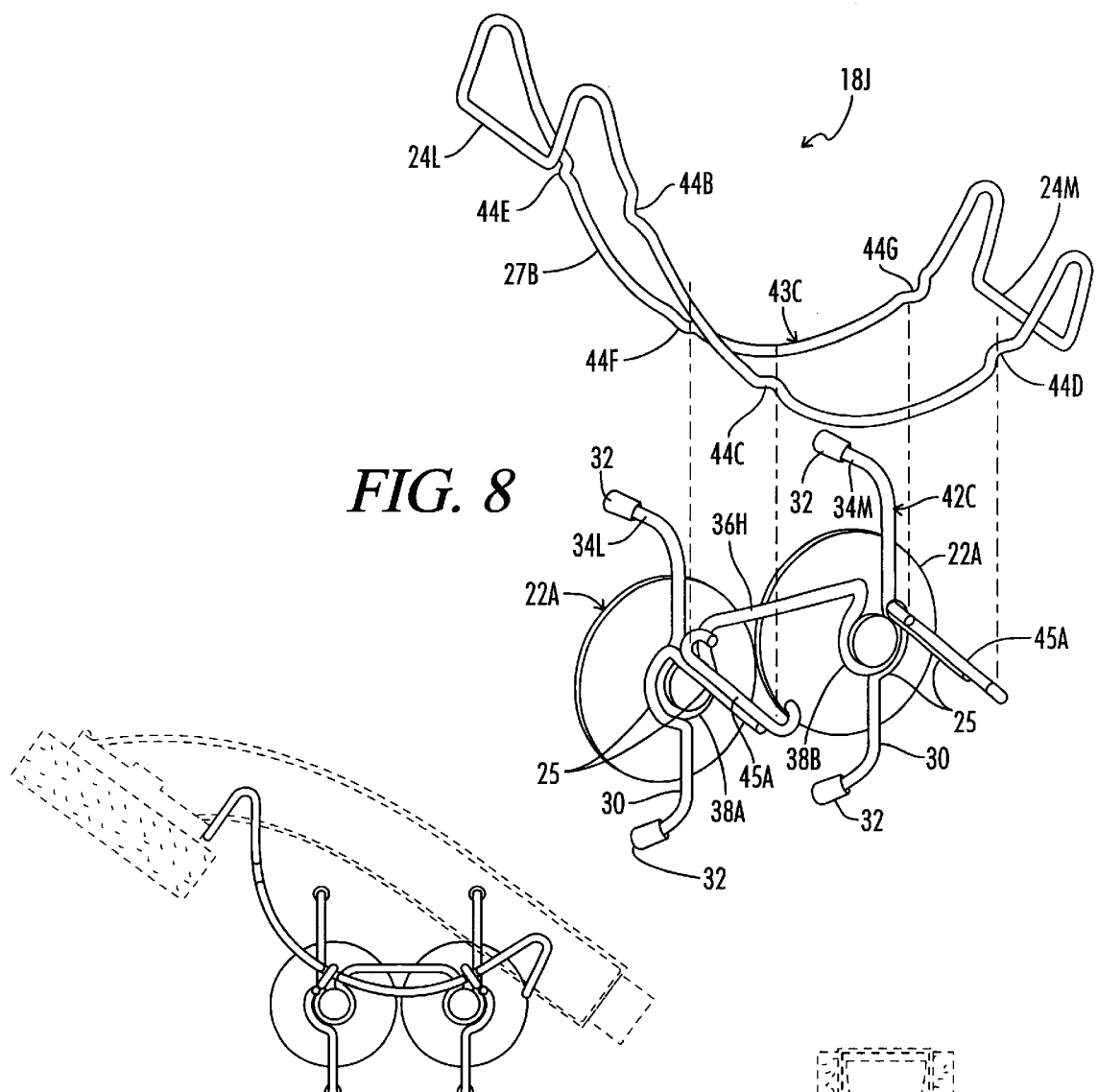
FIG. 8
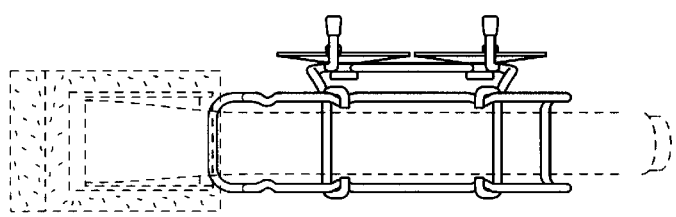
FIG. 8A
FIG. 8B
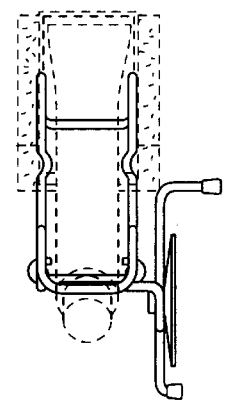
FIG. 8C

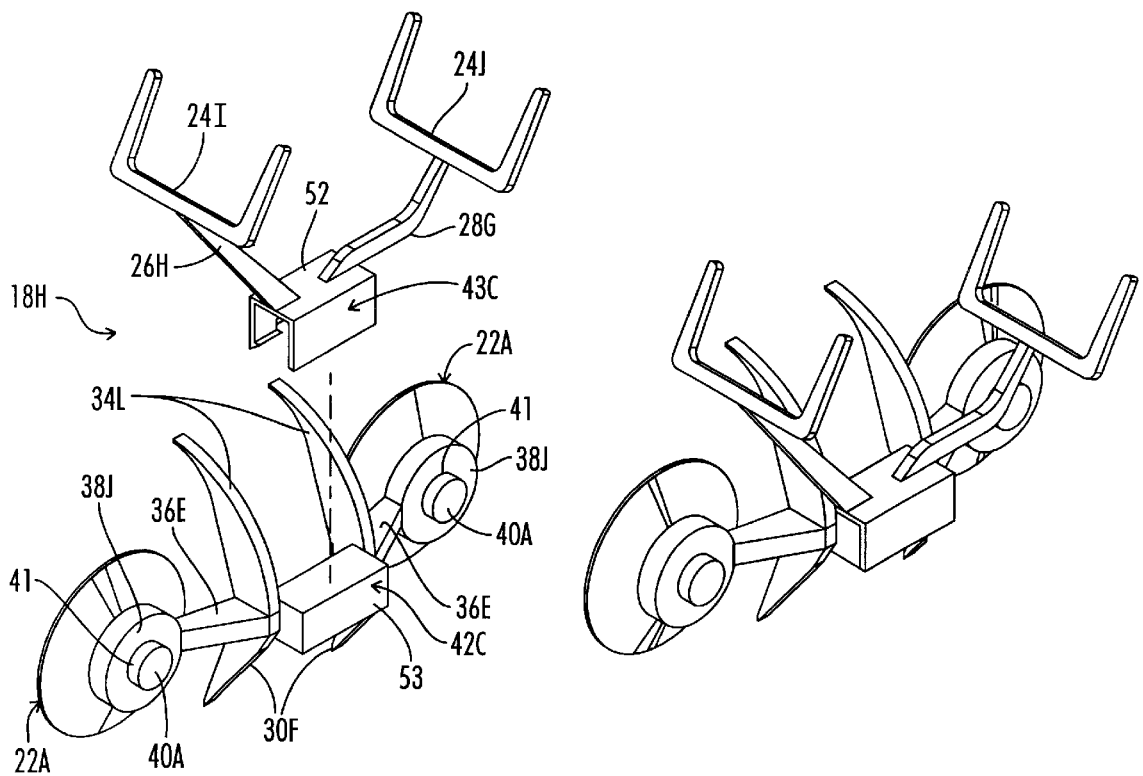
*FIG. 11*     *FIG. 11A*
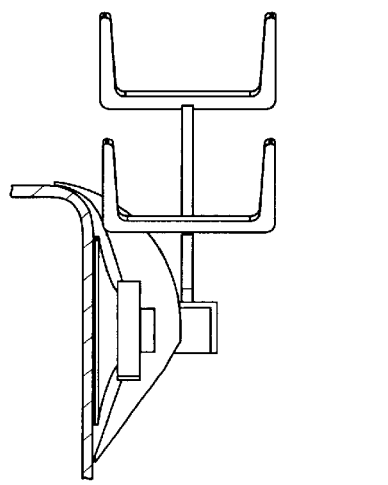     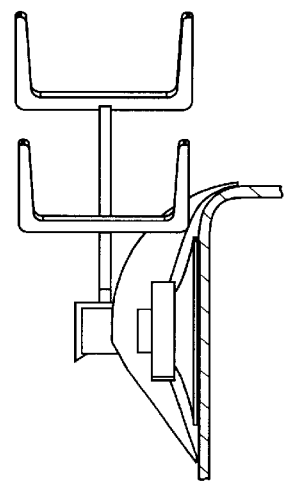     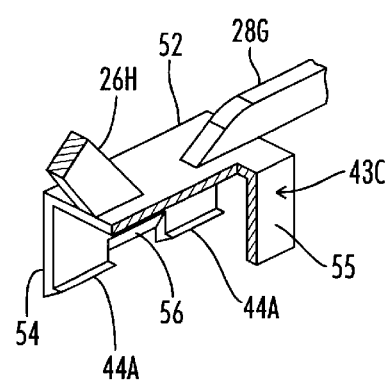
*FIG. 11C*     *FIG. 11D*     *FIG. 11B*

STABLE RACK FOR DISH WASHING SCRUBBERS

BACKGROUND

Field of Invention

This invention relates to the general field of cleaning, specifically, devices for holding or parking hollow-handle, liquid-soap-filled dish washing scrubbers during non-use.

Description of Prior Art

There are many brands of liquid-soap-filled scrubbers for dish washing currently on the market. The most common brands have a hollow handle for receiving concentrated soap, with a sponge type scrubbing element attached to one end of the handle and a screw cap on the opposite end. The hollow handle is in restricted fluid communication with the sponge of the scrubbing element.

The scrubbing element usually consists of a rectangular porous sponge having an open, box-like plastic attaching frame bonded to one face of the sponge. The end of the hollow handle opposite the screw cap flattens and widens so as to mate with the inside floor of the attaching frame. A catch feature on the two side walls of the attaching frame releasably locks the scrubbing element to the handle.

A small hole or orifice in the mating wall of the hollow handle provides fluid communication with the porous sponge. This orifice is purposely small in diameter, in the order of 1 to 2 mm, to limit the volume of soap that can flow to the sponge. The scrubber is used by partially filling the hollow handle with concentrated liquid soap. Thus during use, when the handle is elevated above the scrubbing element, soap gravity-feeds into the porous sponge. The flow stops when the soap in the handle is lowered.

Some models of scrubbers have a flat surface along the the back of their handle, opposite the scrubbing element. This forces the user to awkwardly lay the scrubber upside down onto this flat back surface in order to elevate the scrubbing element, so soap cannot seep into the sponge. Balancing the scrubber on its back of its handle requires extra effort and dexterity especially on some models where the flat area is either very narrow or nonexistent. Consequently, most scrubbers are often laid down without much thought and may allow the soap to continue flowing into the sponge, even when the scrubber is not in use. This is because there is usually no place designated to park the scrubber.

The most severe problem by far, however, is that copious sudsy fluids are created with each use of these scrubbers when water combines with concentrated soap in the sponge. These fluid suds continue to flow effusively from the sponge and form messy puddles on counters regardless of how the sponger is laid. This resulting messy puddling is one of the most objectionable aspects of these scrubbers; to the point that some users squeeze the suds from the sponge after use. Often the soapy suds also coat the handle, making it very unpleasant to hold.

It is obvious therefore, that the suds and fluids flowing effusively after each use alone create most of the messy puddling. This problem remains the main disadvantage in use of these scrubbers, regardless of how effective the method for preventing seepage of the concentrated soap into the sponge between use may be or how or where the scrubber is laid down. Because there is no obvious place designated for holding or parking the scrubber when it is not in use, so often it is simply laid down anywhere in an uncontrollable fashion. Hence, the dripping water-soap fluids create a puddle wherever it is laid. Some users attempt to avoid this problem by placing the scrubber in a dish, hoping to contain the messy puddling that occurs.

These problems exist because there are no suitable auxiliary devices commercially available that both position the scrubber so sudsy fluids created with each use can drain away neatly and elevate the scrubbing element above the liquid soap. The messiness associated with using these scrubbers is so undesirable that it is the primary reason many discontinue their purchase and use altogether.

While there are other various types of racks or holders in prior art, none are disclosed which are designed specifically for holding and positioning hollowhandle liquid soap filled scrubbers to solve the problems described in the foregoing. For example; Odbert U.S. Pat. No. Des. 354,873 is designed to hold loose, unattached sponge pieces or dishcloths. Sohn U.S. Pat. No. Des. 262,257 includes a holder designed specifically to nest an electric-motorized pot scrubber, unsuitable for the purpose of holding hollow handle liquid-soap-filled dish scrubbers. Colquitt U.S. Pat. No. 4,830,198 is a specialized rack for the use by artists to hold the specific contour of airbrush bottles, not remotely related to soap filled, dish-washing scrubbers. Takacs U.S. Pat. No. 5,046,623 is a rack for hanging paint brushes in cleaning fluids and is not applicable. There are also many types of shower caddy holding devices such as; Emery U.S. Pat. Nos. 5,289,927, 5,348,168 and 5,014,860 and by Munoz U.S. Pat. No. Des 376,941, none of which are suitable.

Hence, none of these disclosed devices are suitable for positioning the scrubber in a physical attitude that: allow the sudsy fluids to drain away only into the kitchen sink for proper disposal after each use; keep the soap from seeping into the sponge; allow the handle to be unrestrictedly available for the user's grasp in a ready-to-use position; are mountable to provide a designated location for convenient and easy access to the user. This invention accomplishes all these functions.

SUMMARY

The present invention is directed to racks for receiving and holding dish washing scrubbers which can be releasably attached to a surface of a sink.

The racks of the invention comprise a frame having a scrubber side and an attaching side. A cradle adapted for receiving and holding a scrubber is disposed on the scrubber side of the frame. Attaching means such as a suction cup, are provided on the attaching side of the frame for attaching the rack to a surface of a sink.

One or more arms are provided on the attaching side of the frame above the attaching means, for engaging the sink top to anchor the rack against movement when receiving a scrubber.

Additionally, one or more stabilizer feet may be disposed on the attaching side of the frame below the attaching means. Each such stabilizer foot makes abutting contact with the attaching surface of the sink when the rack is attached thereto. By this arrangement, the force provided by the attaching means is concentrated at each such stabilizer foot, thereby locking the rack to the sink surface.

Additional means are provided for conducting fluids deposited on the rack to be conducted away from the sink top and caused to flow by gravity into the cavity of the sink.

Accordingly it is on object of this invention to solve the problems previously described not presently addressed by prior art, by providing a variety of racks that:

(a) releasably attach the rack to an inner wall or top ledge of a kitchen sink using suction cup means.

(b) comprise a frame that will receive and position a scrubber in such a way that ensures any effluents of soap and water mixture, dripping from the scrubber's scrubbing element after each use, discharges only into the sink for proper disposal and avoids forming messy puddles on a counter.

(b2) comprise a frame that will receive and position a scrubber in such a way that ensures the scrubber's scrubbing element is always elevated above the liquid soap in the handle, so it cannot continue to seep into the sponge.

(c) comprise a frame that has a pair of rack support arms to orient and self-align the rack to its intended vertical and angular position when the rack is attached to the inner surface or top ledge of a kitchen sink.

(d) comprise a frame that has a pair of rack support arms so the rack will not move away during use, as a result of forces exerted by the act of receiving or taking the scrubber from the rack.

(e) allow multiple choices of attaching locations for the rack so it can be placed where it is most convenient and easily reachable to suit each individual user.

(f) allow mounting the rack so as to be equally convenient and accessible for either left-handed or right-handed users.

(g) allow mounting the rack so the handle is openly and unrestrictedly accessible so the user is free to grasp the handle with exactly the same grip used for scrubbing.

(h) self-align and can be mounted easily by any person without requiring any specialized knowledge or tools.

(i) prevent the waste or inefficient use of liquid soap in this type of scrubber.

(j) allow the rack to be manufactured by low-cost methods such as; molding of acrylic or polypropylene plastic, or fabrication of metal wire such as stainless steel or low-carbon steel, with a suitable corrosion protective coating, or of other suitable materials and methods of manufacture.

(k) finally, provide a rack that promotes use of scrubbers by providing a designated, recognizable place for the scrubber that eliminates the disadvantages of messiness and waste.

The racks will increase the desirability and enjoyment of using these low-cost liquid-soap-filled scrubbers because they will remain neater without create messy puddles, thereby effectively promoting their use. Further objects and advantages of this invention will become more apparent from a consideration of the drawings and ensuing descriptions.

BRIEF DESCRIPTIONS OF DRAWINGS

The detailed descriptions of this invention follows and will be better understood when considered together with the drawings listed below. Closely related figures have the same number with alphabetic suffixes.

FIG. 3 is is a perspective view of a second embodiment; a sink-ledge mounting rack having a wire rack frame, one suction cup and a plastic drip diverter shown in phantom view.

FIG. 3A is a perspective, partial cut-away view of the plastic drip diverter of FIG. 3.

FIG. 3B is an end view of the rack of FIG. 3 showing it attached to a sink ledge, with a typical scrubber in place and effluents being diverted into the sink.

FIG. 8 is an exploded view of a fifth embodiment with a wire frame having two portions; a slideable arched cradle portion with a cradle on each end of the arc and a base portion with two suction cups.

FIG. 8A is a perspective view of the assembled rack shown in FIG. 8.

FIG. 8B is a top view of the rack shown in FIG. 8 with a phantom view of a typical scrubber in place FIG. 8C is an end view of the rack shown in FIG. 8 with a phantom view of a typical scrubber in place.

FIG. 11 is an exploded view of a seventh embodiment of the invention with a plastic frame having two portions; a reversible cradle portion like that of FIG. 10, and a rotatable rack base so the two suction cup faces can roughly lie in either a vertical or horizontal plane.

FIG. 11A is a view of the assembled rack of FIG. 11 with the rack base oriented for attachment a roughly vertical sink wall.

FIG. 11B is a partial cut-away detail view of the part of the cradle portion that mates with the base portion of the of rack of FIG. 11.

FIG. 11C is an end view of the assembled rack of FIG. 11, shown attached to a left inner sink wall with the cradles oriented for left-handed users.

FIG. 11D is an end view of the assembled rack of FIG. 11 shown attached to a right inner sink wall with the cradles oriented for right-handed users.

DESCRIPTIONS AND OPERATIONS

Figure 1:
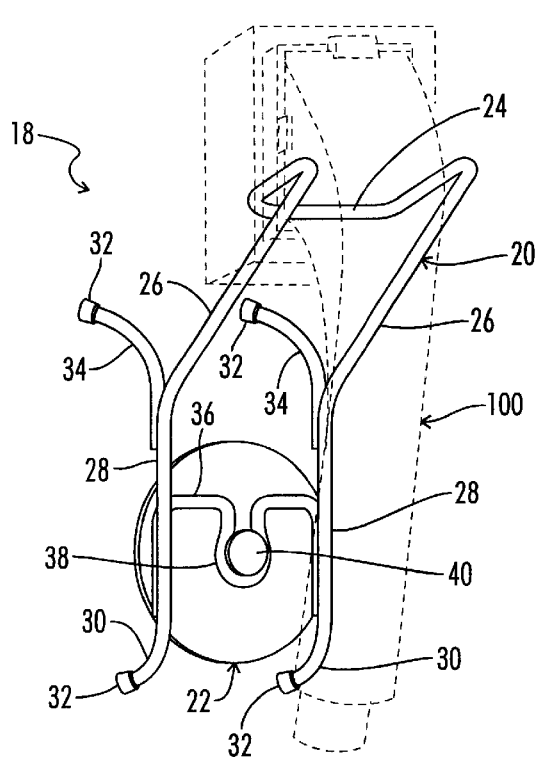
FIG. 1 is a perspective view of the first embodiment of this invention, having a wire rack frame with an upper cradle and a suction cup, with a phantom view of a typical scrubber in place.
Figure 1A:
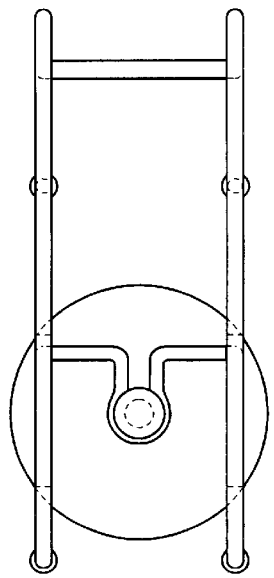
FIG. 1A is a front view of the rack shown in FIG. 1.
Figure 1B:
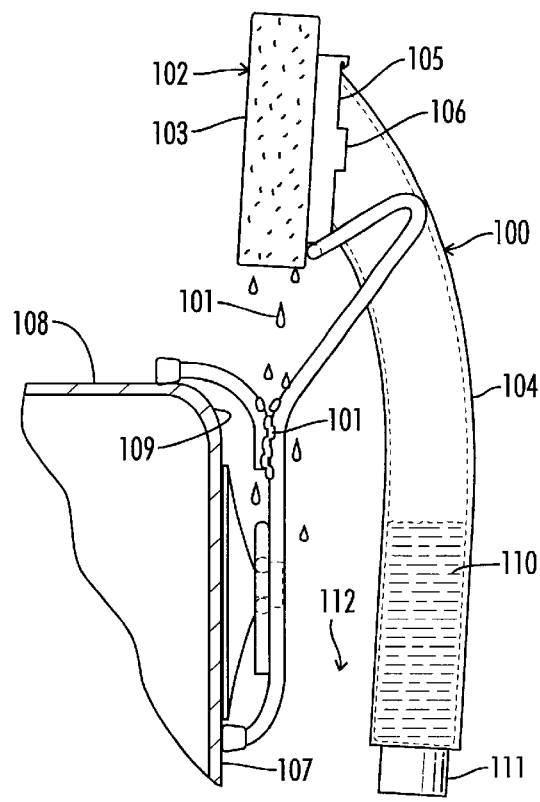
FIG. 1B is a side view of the rack of FIG. 1 illustrating its attachment to a sink and holding a typical scrubber.

FIG. 1 shows a perspective view the first embodiment of my invention, a wire-formed version of a scrubber rack 18, including a phantom view of a typical scrubber 100. FIG. 1A is a front view of scrubber rack 18. FIG. 1B is a side view illustrating scrubber rack 18 in use attached to a sink wall 107 with scrubber 100 in place.

Scrubber rack 18 of FIG. 1 comprises two parts, a rack frame 20 formed of wire and a suction cup 22 of a preselected size commercially available. An upper cradle 24, roughly 3 cm inside width by 2.7 cm deep, caps rack frame 20. Upper cradle 24 has the general shape of a square bottom, upward-opening U, having a first side and a second side which are parallel and tilt 60° clockwise and lie generally in two parallel vertical planes. Each side turns downward and joins an upper frame member 26 each of which continues down and tilted inward about 30°, for some 5.5 cm while remaining roughly in the parallel planes until each joins a lower frame member 28. Each lower frame member 28 then continues vertically downward in the parallel planes for some 5 cm then each joins a stabilizer 30. Each stabilizer 30 then turns inward over about a 1 cm radius for 90° and terminates with a bumper cap 32 optionally installed, each staying roughly in their respective parallel plane.

A rack support arm 34 pair, each having the general shape of the of an upper right quadrant of a circular ring of some 2 cm radius which extends vertically straight down on the right, 0.5 cm below a horizontal center line. The vertical 0.5 cm portion of each rack support arm 34, continguously joins the rear face of each lower frame member 28, where it joins upper frame member 26. Each rack support arm 34 continues to lie in each of the parallel planes. A bumper end 32 is optionally installed on each outer terminus.

A cup holder member 36 having the general shape of an inverted square U, is sized so the lower 0.5 cm length of each side of the U is contiguously joined with the lower rear face of each corresponding lower frame member 28. The horizontal closed end of cup holder member 36, mid-way between each lower frame member 28, then folds downward and immediately opens to form a cup ring 38 which lies roughly in a vertical plane perpendicular to the two parallel planes. Cup holder member 36 is pre dimensioned to position the center of cup ring 38 roughly midway between the lower end of rack support arm 34 and the end of lower frame member 28. The inside diameter of the cup ring 38 is preselected to accept a cup mount diameter 40 of a suction cup 22. Suction cup 22 is installed with its vertical face under rack support arm 34.

As shown by FIG. 1B, the scrubber rack 20 has been designed to hold and position scrubber 100 within sink interior 112. This arrangement ensures that any effluents 101 dripping from the scrubbing element 102 will flow only into the kitchen sink.

Operation of the scrubber rack 18 is also shown in FIG. 1 and FIG. 1B. Scrubber rack 18 can be used in two modes: (1) attached to the flat surface of inner sink wall 107, such as in a kitchen sink, as shown in FIG. 1 and FIG. 1B; and (2), not shown, attached to the flat surface of a horizontal sink ledge 108.

FIG. 1B shows use of scrubber rack 18; FIG. 1B shows a scrubber 100 hanging in place on scrubber rack 18 while attached to an inner sink wall 107 by means of suction cup 22. This done by first wetting the inner face of cup 22, then scrubber rack 18 is held with upper cradle 24 opening upward and with suction cup 22 facing inner sink wall 107. Then lowering scrubber rack 18, so each rack support arm 34 roughly rests on a sink top ledge 108. Then suction cup 22 is compressed firmly against the sink wall 107, while adding a light downward force. This downward force causes each rack support arm 34 to bear firmly against sink top ledge 108, and a inner sink radius 109 which self-aligns rack frame 20 to its intended vertical and angular position. Further, rack support arm 34 thereafter supports the rack 18 so it will not slip down during use. The compression of the cup 22 also causes each stabilizer 30 to press firmly against inner sink wall 107. This stabilizes rack frame 20 so it cannot rock, giving rack 18 a solid feel as scrubber 100 is placed into or removed from scrubber rack 18. This is accomplished by raising scrubber 100 with its scrubbing element 102, facing away over rack 18 and then lowering it down until the lower side of attaching frame 105 of scrubbing element 102, rests on the bottom of the cradle 24. Thus, attaching frame 105 supports the scrubber 100 with hollow handle 104 hanging down. In this position, scrubber 100 may be ambidextrously taken from scrubber rack 18 by either a right or left handed user with equal ease. Further handle 104 is taken with the same grip as used for scrubbing. Scrubber rack 18 also provides a specific identifiable location for holding or parking scrubber 100 when not in use.

Importantly, the scrubber rack 18 positions scrubber 100 so scrubbing element 102 does not extend outside of sink interior 112; assuring that any effluents 101 such as liquid suds or soap will fall only inside a sink interior 112 for sink self-disposal. Not readily apparent is that rack support arm 34 is purposely joined to rack frame 20 well below the surface of a the sink top ledge 108. This assures that any effluents 101 dripping from scrubbing element 102 onto the rack frame 20, can only capillarily flow into sink sink interior 112; which would otherwise occur if rack support arm 34 joined rack frame 20 above the sink top ledge 108. Significantly too, liquid soap 110 in handle 104 lies below the hole into scrubbing element 102, so the soap 110 cannot continue to flow into sponge 103.

Scrubber rack 18 of FIG. 1 can also be used on a horizontal surface, (not shown). In this mode, scrubber rack 18 will rest on the terminus of each rack support arm 34 and of each stabilizer 30, with upper cradle 24 opening upward. Rack 18 is attached to the desired horizontal surface location by positioning the rack 18 with the moistened suction cup 22 facing down. Then the suction cup 22 is compressed down firmly causing each leg of cup holder member 36 to flex downward so suction cup 22 can reach and attach rack frame 20 to that horizontal surface. In this mode the user has the option of placing scrubber 100 in rack 18 with the scrubbing element 102 facing up or down.

Scrubber rack 18 is used in this mode with scrubbing element 102 facing down by simply raising scrubber 100, so it extends just beyond rack frame 20. Then lowering the scrubber 100 into upper cradle 24 while releasing a handle 104. This allows the handle 104 to slide down until the lower end side of an attaching frame 105 comes to rest against the bottom of upper cradle 24 with the scrubbing element 102 elevated above a liquid soap 110.

In the case where rack 18 is used in this mode with scrubbing element 102 facing up, scrubber 100 is placed in scrubber rack 18 as previously described, except in this case, scrubber 100 is supported by the tips of the sides of cradle 24 bearing on the edges of the sides of attaching frame 105. In this mode, scrubber 100 is supported in the rack 18 without touching the the bottom of cradle 24. Additionally, in this mode, rack 18 may be mounted facing to the left or to the right so it may be used by a right or left handed user with equal ease and provides a specific identifiable place for holding the scrubber between use.

Figure 2:
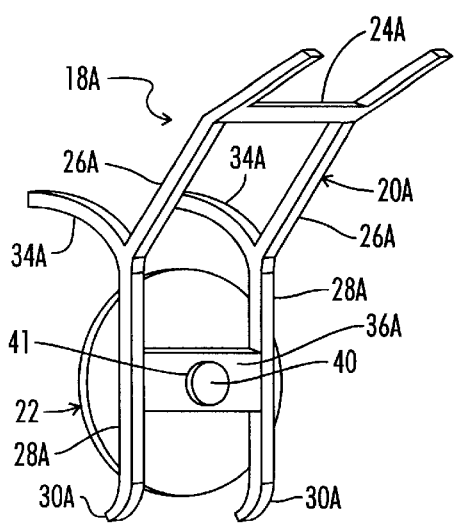
FIG. 2 is a perspective view of a plastic molded frame version of the one shown in FIG. 1.

FIG. 2 is a perspective view of a scrubber rack 18A, a plastic version of the in-sink, hanger-type, single cup rack similar to scrubber rack 18 FIG. 1, having generally the same size and shape and size, as well as also being ambidextrous. It comprises a rack frame 20A and also utilizes suction cup 22. In FIG. 2 the configurations, disposition and dimensions of the features of scrubber rack frame 20A, as with rack frame 20 shown in FIG. 1B, are preselected to hold and position a scrubber 100 within a sink interior 112. This ensures an effluents 101 dripping from a scrubbing element 102 will flow only into interior sink 112.

Rack frame 20A is a one-piece molding of acrylic, polypropylene or other resin suitable for the application. It has a thickness and width in the order of 2.5 mm×3 mm, except for a cup holder member 36A which is about 2 cm high. Rack frame 20A is capped by an upper cradle 24A, having an upward opening U-shape, with a first side and a second side each parallel and tilted outward some 30° lying mostly in parallel planes roughly 3 cm apart. The face of upper cradle 24A is perpendicular to these parallel planes. An upper frame member 26A pair joins the lower extremities of upper cradle 24A, then also tilt down and outward about 30°, lying mostly in the parallel planes. After some 5.5 cm down, each upper frame member 26A forms a junction to the top end of each of a lower frame member 28A pair, and to each of a rack support arm 34A pair. Each rack support arm 34A then extends away from this junction and turns upward and inward in roughly a parallel 90°, 2 cm radius, arc and terminate, staying mainly within the parallel planes. Each lower frame member 28A then extends vertically downward about 5 cm where each join a stabilizer 30A pair each of which turns 90° inward over a 1 cm radius and terminates.

Cup holder member 36A joins each lower frame member 28A at right angles roughly at mid height. A cup hole 41 of a diameter preselected to accept a cup mount diameter 40, is disposed at the center of the face of member 36A. Lastly, a cup mount diameter 40 of Suction cup 22 is inserted in cup hole 41 so the face of the cup 22 lies under rack support arm 34A.

Not shown is a means for allowing suction cup 22 of FIG. 2, to flex for horizontal mounting in a manner similar to that of FIG. 1. This flexing capability can be added by changing cup holder member 36A to a inverted square U shape with two legs sides having their outer faces contiguous with the inner faces of lower frame member 28A and whose ends attached to the lower end of each member 28A.

Operation of rack 18A depicted in FIG. 2 is exactly the same as scrubber rack 18 as depicted in FIG. 1B. It is also ambidextrous and provides a specific identifiable location for parking scrubber 100 of FIG. 1B, between use.

FIG. 3 is a perspective view of second embodiment, a scrubber rack 18I which is an ambidextrous version for releasably mounting on sink ledge 108 of FIG. 3B. It has one suction cup 22 and a cradle 24K on which scrubber 100 of FIG. 3B is hung, as in FIG. 1 and FIG. 2. Scrubber rack 18I comprises a frame 20H of formed wire, a drip diverter 57, preferably of transparent plastic, and a suction cup 22; each of whose form, dimensions and disposition serve to support and position scrubber 100 so dripping effluents 101 flow only into sink interior 112, as shown in FIG. 3B.

Rack frame 20H is formed in the general shape of a long, inverted, square-bottom U, having parallel and vertical coplanar legs some 13 cm long and 3 cm separation. The upper closed end of the U is folded symmetrically inward over some 150°, forming an upper cradle 24K, having a square U-shape with a roughly 30 mm wide upward opening and 2.7 cm depth having a first side and a second side. Each side of cradle 24K and its adjoining remaining leg, roughly 10 cm long, generally lie in parallel vertical planes, perpendicular to the closed bottom end of cradle 24K.

The upper about 5 cm length of each leg joining upper cradle 24K, again symmetrically bends downward and inward some 45°, forming a upper frame member 26I. The lower some 5 cm length of each leg, then symmetrically folds back and up in a hair-pin bend then turns upward and rearward over some 2 cm radius 90° arc forming a rack support arm 34M. Each then proceeds horizontally to the rear, forming a stabilizer arm 30G which terminates by turning down a quarter turn with a roughly 1 cm arc. Stabilizer arm 30G and rack support arm 34M and continue to lie mostly in the parallel planes of upper frame member 26I. A bumper cap 48 is optionally installed on the terminus of each stabilizer arm 30G.

A cup holder member 36F, generally shaped as an outward facing, horizontal square U with its outer legs are each contiguously joined to the inner face of each adjacent stabilizer arm 30G, at about its mid length. The center of the closed end of the U then folds roughly 90° rearward, in the plane of the U, then opens to form a cup ring 38. The inner diameter of cup ring 38 is predetermined to accept a cup mount diameter 40 of suction cup 22 which is installed under stabilizer arm 30G.

FIG. 3A is a perspective view of drip diverter 57 which is preferably molded of a transparent acrylic, polypropylene or other plastic suitable for this application. Drip diverter 57 has the general shape of a dustpan with 0.5 cm high walls on three of its outer edges, and is roughly 1.5 mm thick. As in a dustpan, the height of each side portions of a diverter wall 59, taper down to meet a curved diverter lip 58 at the open end. Diverter lip 58 is curved to match the radius of rack support arm 34M of FIG. 3 and fit in the hairpin bend where rack support arm 34M joins upper frame member 26I. The middle center half portion of the edge of curved diverter lip 58 is replaced by a flow director 60, where is a wall, some 3 mm high above the lip's curved surface and has a roughly elliptical arch-shaped perimeter, 1.7 cm wide by 0.7 cm deep from the edge of the lip which ensures effluents flow to each side of the open end, away from the roughly centered scrubber handle. When the curved diverter lip 58 of FIG. 3A is assembled to rack frame 20H of FIG. 3, the open floor slopes roughly a 30° slope down toward the open end of lip 58.

The underside of drip diverter 57 surface has a mounting leg 61 pair with cross-section 0.5 cm×0.7 cm and extending vertically downward. Mounting leg 61 has a rectangular cross section dispositioned with the wider face toward diverter lip 58, roughly centered over stabilizer arm 30G of FIG. 3 and opposite the center of suction cup 22. The center lower portion of the wide face of leg 61 is slotted vertically by a frame grip slot 62, of a width and depth predetermined to grip the diameter of stabilizer arm 30G of FIG. 3. Additionally, frame grip slot 62 then narrows and continues upward about another 0.5 cm becoming a grip spring slot 63. This bifurcation of diverter mounting leg 72 enhance its grip of stabilizer arm 30G of FIG. 3. Drip diverter 57 is preferably of a transparent material so as to minimize the visual intrusion of scrubber rack 18I into the sink work area.

Although only a wire formed version of rack frame 20H is shown in FIG. 3, it is obvious that a plastic molded version of this rack may be easily designed from the foregoing description. Hence, such a further embodiment is assumed to be included in the foregoing description.

Operation of scrubber rack 18I is shown in FIG. 3B. It is a wire formed, ambidextrous sink ledge, hanger-type, rack with plastic drip diverter of FIG. 3A. Rack frame 20H of scrubber rack 18I depicted as FIG. 3B is removably attached to the rear inner top ledge of a kitchen sink by first wetting the inner face of the suction cup 22. It is then positioned wet face down, so each rack support arm 34M roughly mates with the rounded inner sink edge 109 of the sink. Rack frame 20H is then attached by compressing cup 22 down against sink top ledge 108, with a slight force away from sink interior 112. This slight force causes each of the two rack support arm 34M to bear firmly against rounded inner sink edge 109; thus self-aligning rack frame 20H to its correct horizontal and angular location. After installation, the two rack support arm 34M support scrubber rack 18I so it will not slip away during use. Compression of the cup also causes the terminus of stabilizer arm 30G to also bear firmly against sink top ledge 108 which stabilizes rack frame 20H so it cannot rock. This gives scrubber rack 18I a solid feel as scrubber 100 is taken or replaced.

After rack frame 20H is properly attached to the ledge of the sink, drip diverter 57 is installed by slipping curved diverter lip 58 into the space between upper frame member 26I and rack support arm 34M so curved diverter lip 58 mates With the curve of rack support arm 34M. Then ensuring that each mounting leg 61 and each frame grip slot 62 are aligned over their respective rack support arm 34M, and pressing the drip diverter 57 down. This causes each mounting leg 61 to snap onto rack support arm 34M of frame 20H by the tight fit of frame grip slot 62 with its cooperating grip spring slot 63. FIG. 3B illustrates the function of transparent drip diverter 57 diverting any effluents 101, of soap-water suds or soap dripping from scrubbing element 102 to flow into sink interior 112, it may also be periodically removed for cleaning and then replaced.

The rack is used by holding scrubber 100 with scrubbing element 102 elevated and facing to the rear, then lowering it while hooking it over cradle 24K. The causes the lower side of attaching frame 105 to rest on the bottom of the cradle cradle 24K and the lower end of hollow handle 104 with liquid soap 110 is allowed to hang down against inner sink wall 107. Thus liquid soap 110 is below and cannot seep into scrubbing element 102. This embodiment of scrubber rack has the distinct advantage of minimizing intrusion of the rack and scrubber into the sink's working area and is especially useful for small sinks. Additionally, scrubber rack 18I is ambidextrous for equally convenient use by either a right or left handed user and provides a designated place for parking the scrubber between use.

Figure 4:
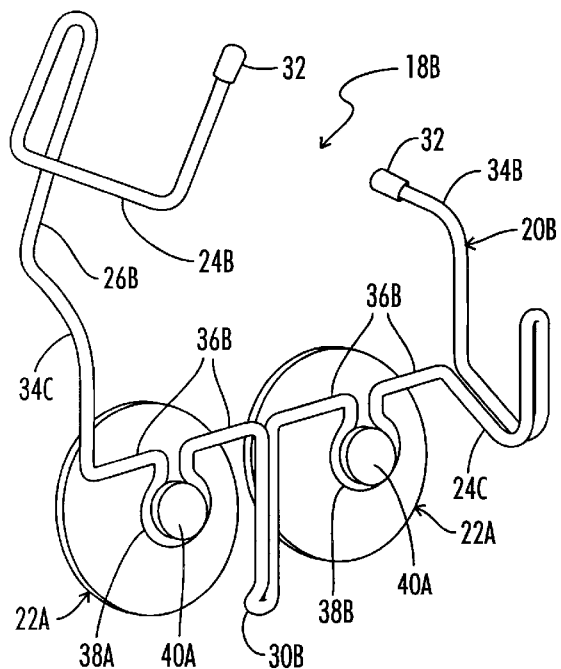
FIG. 4 is a perspective view of a third embodiment having a wire rack frame with two cradles and two suction cups.

FIG. 4 is a perspective view of a third embodiment of a scrubber rack 18B, being an in-sink cradle-type, wire-formed rack. It comprises three parts; a rack frame 20B formed of wire, two of a suction cup 22A and two cradles, an upper cradle 24B and a lower cradle 24C; each of whose form, dimension and disposition position scrubber 100 so as in FIG. 1B, so any effluents 101 dripping from the scrubbing element 102 will flow only into sink interior 112 for self disposal. The lower part of rack frame 20B has two mirror-imaged lower sections, the top which is a cup holder member 36B pair is horizontal and coaxial. The mid length of each member 36B folds downward and then opens to each form a left cup ring 38A and a right cup ring 38B, of inner diameter suited to accept a cup mount diameter 22A.

The opposing inner ends of each cup rack member 36B, meet roughly at the center of rack frame 20B and bend contiguously downward for roughly 4 cm and each end then turns inward over a 1 cm radius arc forming a stabilizer 30B, then join in a tight hairpin-like terminus. The right outer end of cup rack member 36B turns outward for about 4 cm, perpendicular to the face of the right cup ring 38B, then folds contiguously back beside itself with a tight hairpin-like terminus. After the first some 2.5 cm, the contiguous pair turns upward 1.5 cm forming the bottom and outer side of lower cradle 24C. Only the outer one of the contiguous pair then bends upward, generally in the plane of cup ring 38B, for roughly 2.5 cm forming the inner side of lower cradle 24C, then curves upward up and inward roughly 90° over some 2 cm radius and terminates to form a right rack support arm 34B. A bumper-end cap 32 for the terminus is optional.

The left outer end of cup rack member 36B bends up for roughly 2.5 cm then curves upward up and inward roughly 90° over some 2 cm radius forming a left rack support arm 34C, generally parallel to right rack support arm 34B. The end of left rack support arm 34C then turns upward and outward roughly 30° from the vertical, to form a upper frame member 26B about 5 cm long. The top end of upper frame member 26B joins the upper inner side of cradle 24B,that has a generally upward opening, square U-shape, about 3 cm wide and 2.5 cm inside depth. The face of upper cradle 24B lies mainly in a plane tilted some 30° clockwise and perpendicular to the plane of left cup ring 38A. A bumper-end cap 32 on the terminus of the outer side of upper cradle 24B is optional.

Scrubber rack 18B is completed by inserting a cup mount diameter 40A of suction cup 22A from the rack support arm side, into left cup ring 38A and right cup ring 38B.

Operation of scrubber rack 18B is achieved by removably attaching it to the inner wall of a kitchen sink by first wetting the inner face of cup 22A. Then referring to FIG. 1B, roughly mating each of right rack support arm 34B and left rack support arm 34C, to the rounded inner sink edge 109, then firmly compressing each cup 22A against inner sink wall 107, along with a light downward force. The downward force causes right rack support arm 34B and left rack support arm 34B to bear firmly against rounded inner sink edge 109. This self-aligns scrubber rack 18B to its correct vertical and angular position then supports the rack vertically so it will not slip down during use. Compressing the cups against inner sink wall 107 also causes the terminus of the stabilizer arm 30B to bear firmly against sink wall 107, so scrubber rack 18B cannot rock. This stabilization gives it a solid feel as scrubber 100 is inserted or taken from scrubber rack 18B.

Referring to FIG. 1B, scrubber 100 of can then be placed into scrubber rack 18B with the scrubbing element 102 either facing up or facing down. In the case where the scrubbing element 102 is facing down, scrubbing element 102 is raised then lowered hooked over upper cradle 24B. This act causes the lower end of hollow handle 104 to slideably rest in lower cradle 24C until the lower side of attaching frame 105 comes to rest down against the closed end of upper cradle 24B. Note that in this case, the sides of upper cradle 24B function only to constrain handle 104 within the cradle.

In the case where scrubbing element 102 is facing up, the tips only of the sides of upper cradle 24B support the lower edges of attaching frame 105. A catch feature 106 extending from each side of attaching frame 105 stops the downward sliding of scrubber 100 so it comes to rest. In this mode the scrubber is supported without touching the closed end of upper cradle 24D while handle 104 continues to rest in lower cradle 24C.

It should be noted that, whether the scrubber is placed in the rack with the scrubbing element up or down, the lower capped end of handle 104 rests in lower cradle 24C. Thus a liquid soap 110 is always lower and cannot seep into sponge 103 which is higher. More importantly, in either mode, any effluents 101 flowing down from sponge 103 after each use will flow only into the sink for self-disposal. Additionally, scrubber rack 18B provides a designated place for parking the scrubber between use.

Figure 5:
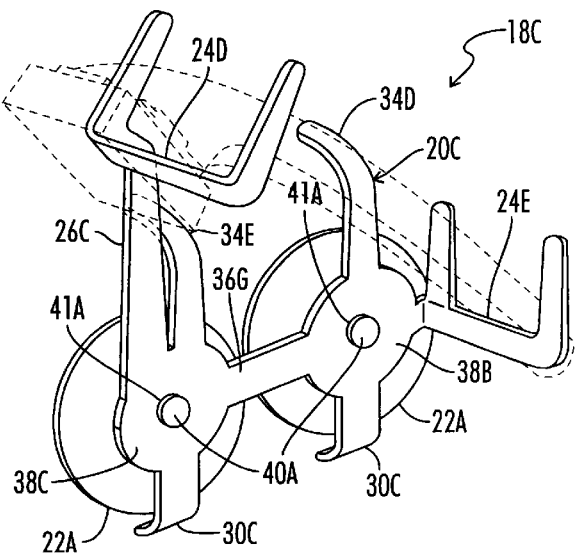
FIG. 5 is a perspective view of a plastic molded frame version of that of FIG. 4.

FIG. 5 is a perspective of a scrubber rack 18C which a plastic molded version of the embodiment of the scrubber rack 18B of FIG. 4. Scrubber rack 18C is comprised of plastic rack frame 20C, roughly 2 mm thick and suction cup 22A pair; each of whose form, dimension and disposition position scrubber 100, so any effluents 101 dripping from the scrubbing element 102 will flow only into sink interior 112 for self disposal. The extremities of the flat face of each element of rack frame 20C terminate in a full radius, frame 20C is comprises a right cup ring 38B and a left cup ring 38C, each being flat and round, with about a 2.5 cm diameter. They are joined at their respective adjacent side center edges by a cup holder member 36G, roughly 4.5 cm long and 1 cm high, so all faces generally lie in a vertical plane. A stabilizer arm 30C about 1 cm wide extends down roughly 3 cm from the center lower edge of both right cup ring 38B and left cup ring 38C. Then each stabilizer arm 30C tapers to about 0.5 cm wide and terminate by turning away roughly 90° over a 1 cm radius arc.

The left bottom corner of a lower cradle 24E, perpendicularly joins the center right edge of right cup ring 38B at it horizontal center line. The face of lower cradle 24E is perpendicular to the plane of the cup ring 38B and extends outward. It has a generally square U-shape, roughly 3 cm inside width and a 1.5 cm depth and opens upwards.

A right rack support arm 34D, roughly 0.8 cm wide extends upward from the center top edge of right cup ring 38B and curves upward up and inward roughly 90° over about a 2 cm radius and terminates. A left rack support arm 34E extends upward with its left edge mostly on the vertical center line of left cup ring 38C, but otherwise having similar dimensions and shape as right rack support arm 34D and being parallel to it.

A upper frame member 26C, roughly 1 cm wide extends upward from the top left edge of left cup ring 38C. After about 3.4 cm, upper frame member 26C tapers to near 0.4 cm wide and bends counterclockwise about 30° to perpendicularly join the inner lower side corner edge of an upper cradle 24D. The face of upper cradle 24D generally lies in a plane rotated 30° clockwise and perpendicular to the plane of the cup rings. Additionally, the vertical centerline of the face of upper cradle 30E is tilted downward roughly 11° to compensate for draft angle of a kitchen inner sink wall 107. The opening of the upper cradle 24D is about 3 cm wide and 2.8 cm deep. The cross section of its members is 2×2.5 mm, except the flat open ends of the sides taper to 2×2 mm.

Scrubber rack 18C completed with the installation of a suction cup 22A into a cup hole 41A in the center of right cup ring 34B and of left cup ring 38C with the cup's face opening to the rear. The diameter of cup hole 41A is preselected to mate with the cup mount diameter 22A.

Operation of the in-sink cradle-type, plastic, two cup rack 18C of FIG. 5 is identical to that of scrubber rack 18B of FIG. 4. Hence, it is mounted and used in identically the same way and with the same advantages.

Figure 6:
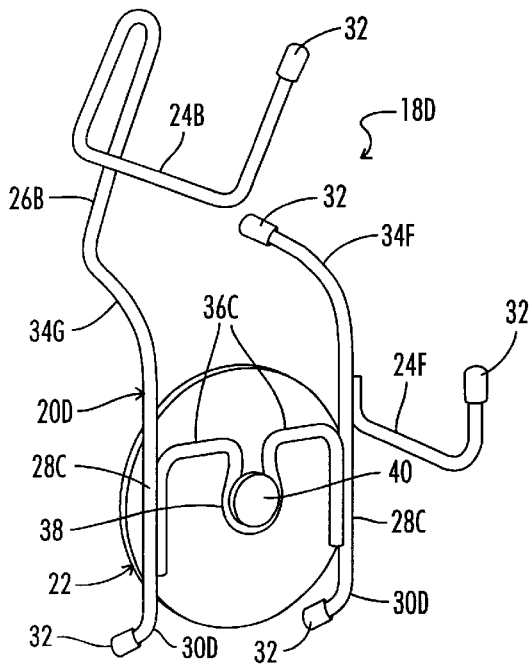
FIG. 6 is a perspective view of a fourth embodiment of the invention, a one suction cup, simplified frame version of the one shown in FIG. 4.

FIG. 6 shows a a perspective view of a fourth embodiment, an in-sink cradle-type, single cup scrubber rack 18D, functionally similar to the scrubber rack 18B of FIG. 4, except it has only one suction cup 22. It comprises; a rack frame 20D, that is wire-formed and a suction cup 22; each of whose form, dimension and disposition position and hold scrubber 100 so as in FIG. 1B, so any effluents 101 dripping from the scrubbing element 102 will flow only into sink interior 112 for self disposal.

A lower frame member 28C pair of rack frame 20D are vertical and generally lie in parallel planes roughly 5 cm apart, perpendicular to the face of suction cup 22. Each lower frame member 28C terminates by turning away roughly 90° over a 1 cm radius arc to form a stabilizer 30D and ends with optional bumper end-cap 48.

The upper end a lower frame member 28C on the left curves upward and inward over a roughly 2 cm radius to form a left rack support arm 34G. Similarly on the right, lower frame member 28C also curves upward and inward over a roughly 2 cm radius to form a right rack support arm 34F which terminate with the optional bumper end-cap 48. The upper end of left rack support arm 34G continues upward forming upper frame member 26B and upper cradle 24B identical to that of FIG. 3. The open end of upper cradle 24B also terminates with the optional bumper-end cap 32.

A third part of rack frame 20D is a cup rack member 36C that is horizontal and whose outer ends bend downward 1 cm. Each end is each contiguous with and attached to the inner faces of the two lower frame member 28C at roughly mid-height. The midpoint of horizontal part of cup rack member 36C folds downward roughly 90° and then opens to form a cup ring 38. The inner diameter of cup ring 38 is predetermined to accept cup mount diameter 40 of suction cup 22.

A lower cradle 24F, has a square U shape and its face lies roughly in the right plane of the two parallel planes. The inner side of lower cradle 24F is about 1 cm high and is attached to the right face of right frame member 28C. Cradle 24F is 3 cm wide inside the outer side is about 1.5 cm high. Its terminus is also optionally capped with bumper end-cap 32.

Operation of scrubber rack 18D of FIG. 6, is in a manner similar to scrubber rack 18B depicted in FIG. 4. Other than having only one suction cup 22, it is otherwise applied and used in exactly the same manner and with the same advantages of scrubber rack 18B.

Figure 7:
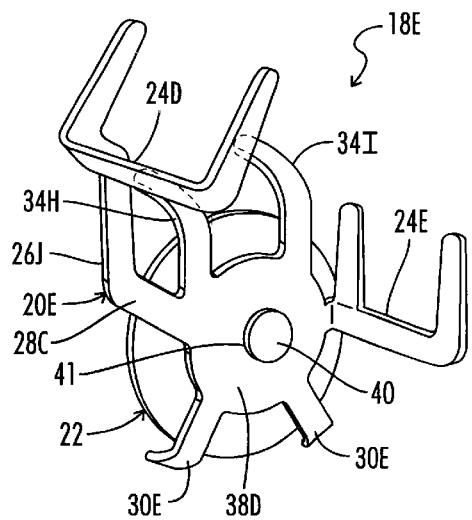
FIG. 7 is a perspective view of a plastic molded frame version of the invention shown in FIG. 6.

FIG. 7, a scrubber rack 18E, is a plastic version of scrubber rack 18D of FIG. 6; an in-sink single cradle, single cup rack. It comprises a rack frame 20E molded of plastic and suction cup 22; each of whose form, dimension and disposition position and hold scrubber 100 so, as shown in FIG. 1B, any effluents 101 dripping from the scrubbing element 102 will flow only into sink interior 112 for self disposal.

The center of rack frame 20E is a cup ring 38D about 3.5 cm diameter having its face in a vertical plane, with members emanating from its outer edge. A left rack support arm 34H and right rack support arm 34I, of size and shape similar to left rack support arm 34E and right rack support arm 34D of FIG. 5, rise from the top edge of cup ring 38D on about 1 cm on each side of the the vertical centerline..

An lower frame member 28C, roughly 0.8 cm wide, extends out from the upper left edge of cup ring 38D, along about a 45° axis for about 1 cm and turns upward to form upper frame member 26J. Upper frame member 26J joins upper cradle 24D both of which are identical in disposition, size and shape to upper frame member 26J and upper cradle 24D of FIG. 5. A lower cradle 24E, identical in size, shape and location as in FIG. 4, joins the right mid right edge of cup ring 38D.

A stabilizer arm 30E extends downward for about 2 cm along the lower 45° axis on the left and right side of the vertical center line of cup ring 38D. The lower ends of stabilizer arm 30E terminate by turning inward 90° over a 1 cm radius.

Scrubber rack of FIG. 7 is completed with the insertion a cup mount diameter 40 into cup hole 41 through cup ring 38D so suction cup 22 faces to the rear.

Operation of scrubber rack 18E depicted in FIG. 7 is identical to that of scrubber rack 18D shown in FIG. 6, since it is a molded version of scrubber rack 18D and can be used exactly in the same way and with the same advantages.

FIG. 8 is a perspective exploded of a fifth embodiment, an in-sink cradle-type, ambidextrously adjustable, wire-formed, dual cup rack 18J. This version is functionally like wire-formed scrubber rack 18F of FIG. 4, except it comprises; a base portion 42C and a cradle portion 43C that is slideably adjustable to detents for a right handed or a left handed user, as well as, two of a suction cup 22A.

Cradle portion 43C consists of two coaxial arcs, a front cradle arc 27 and a rear cradle arc 27B. Each subtends 166° of the lower mid perimeter of 10 cm diameter circles that lie mainly in parallel planes. The arcs are joined at each end by two opposite facing cradles, left cradle 24L and right cradle 24M, identical to upper cradle 24 of FIG. 1. The face of each cradle lies roughly in planes tangent to each of the opposite ends of arc pair and perpendicular to the parallel planes of the arcs. Front cradle arc 27 is indented inward in three places perpendicular to the face of the arc, to form a front center detent 44C, centered along the vertical diameter line bisecting front cradle arc 27. Similarly a front left detent 44B and a front right detent 44D are formed at diameter lines each lying 28° on each side of the vertical line, to form a front left detent 44B and front right detent 44D. The depth and width of each detent is preselected to receive a diameter of the wire. Rear cradle arc 27A has a rear center detent 44F, a rear left detent 44L and a rear right detent 44G that are mirror corresponding images of the detents on front cradle 27.

Base portion 42 is symmetrical along a vertical bisecting line, so the left side and the right side of the line are mirror images of each other. A cup holder member 36H is horizontal and joins the upper inner ends of left cup ring 38A and right cup ring 38B. The outer end each of left cup ring 38A and right cup ring 38B rise vertically for some 2.5 cm then curves upward up and inward roughly 90° over some 2 cm radius and terminates to form a right rack support arm 34B. A bumper-end cap 32 for the terminus is optional, to form a left upper frame member 26K and a right frame member 26L respectively. Then left upper frame member 26K and right frame member 26I. each continue upward and inward 90° over a 2 cm radius to form a left rack support arm 34L and a right support arm 34M respectively, whose termini are optionally capped with bumper end cap 32. The upper end each of a left stabilizer arm 30J and a a right stabilizer arm 30K, of size and shape similar to that of left stabilizer arm 30 with end cap 32 of FIG. 1, rise to meet the lower center each of left cup ring 38A and right cup ring 38B respectively; then curve to contiguously join respectively with their outer 100° periphery. Then each end bends outwardly and perpendicularly to the face of left cup ring 38A and right cup ring 38B, for about 2.5 cm and terminates.

A pawl channel guide 45A has the shape of a narrow chain link with parallel sides and rounded ends, except an opening replaces the straight portion of one side. Pawl channel guide 45A has an inside length and width to grip opposing detents, such as front center detent 44C and rear center detent 44F of cradle portion 43, so the sides of front cradle arc 27 and rear cradle arc 27A remain in the vertical parallel planes. The closed side of pawl channel guide 45A is contiguously mated to left stabilizer arm 30J, along a horizontal line in its upper face which lies in a plane passing perpendicularly through a 28° diameter line. The face of pawl channel guide 45A also lies roughly in that plane and is joined to left stabilizer arm 30J beginning at a point some 1.5 cm from the outer face of left cup ring 38A. A second pawl channel guide 45A is mated to the inner horizontal face of a right stabilizer arm 30K in a manner that results in a mirror image of the left pawl channel guide 45A so that the faces of each tilt inward roughly 28°. Scrubber rack 18J is completed by inserting a cup mount diameter 40A of suction cup 22A from the rack support arm side, into left cup ring 38A and right cup ring 38AB.

Operation of scrubber rack 18J is done by first wetting the inner face of each suction cup 22A of base portion 42. Then referring to FIG. 1B, base portion 42 is held with each suction cup 22A facing inner sink wall 107. Then lowering base portion 42, so left rack support arm 34L and right rack support arm 34M roughly rest on a sink top ledge 108. Then each suction cup 22A is compressed firmly against the sink wall 107, while adding a light downward force. This downward force causes each support arm to bear firmly against sink top ledge 108, and inner sink radius 109, which self-aligns base portion 42 to its intended vertical and angular position.

Cradle portion 43 is then held with left cradle 24L, and right cradle 24M opening up, front cradle arc 27 and rear cradle arc 27B are squeezed together and simultaneously nested in pawl channel guide 45 on the left and pawl channel guide 45 on the right and releasing. Note that each channel guide is perpendicular to the arcs and are spaced to simultaneously slideably engage two of the three front and rear corresponding detents. When pawl channel guide 45 engages front center detent 44C and corresponding rear center detent 44F, together with front right detent 44D and corresponding rear right detent 44G, scrubber rack 18J is set for use by a right handed user. Then when pawl channel guide 45 engages front center detent 44C and corresponding rear center detent 44F, together with front left detent 44B and corresponding rear left detent 44E, scrubber rack 18J is set for use by a left handed user. Thus the rack is ambidextrous, since it can be rapidly changed by simply squeezing front cradle arc 27 and rear cradle arc 27B together and sliding them and letting go into the proper detent pairs.

Figure 9:
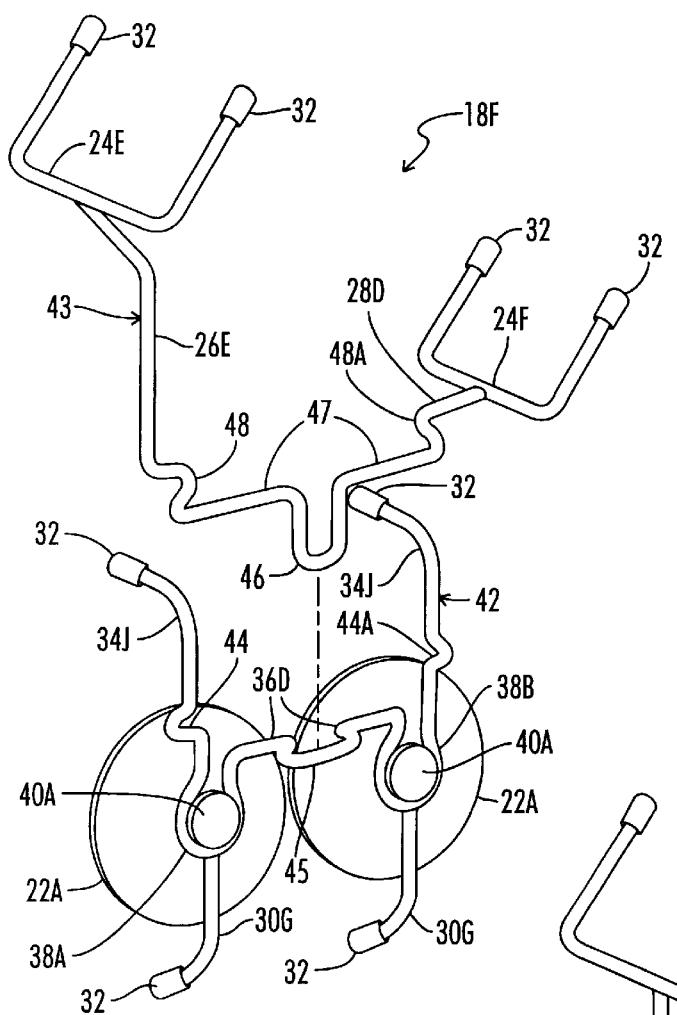
FIG. 9 is an exploded view of a sixth embodiment with a wire frame having two portions like the one of FIG. 8, except the cradle portion is reversible.
Figure 9A:
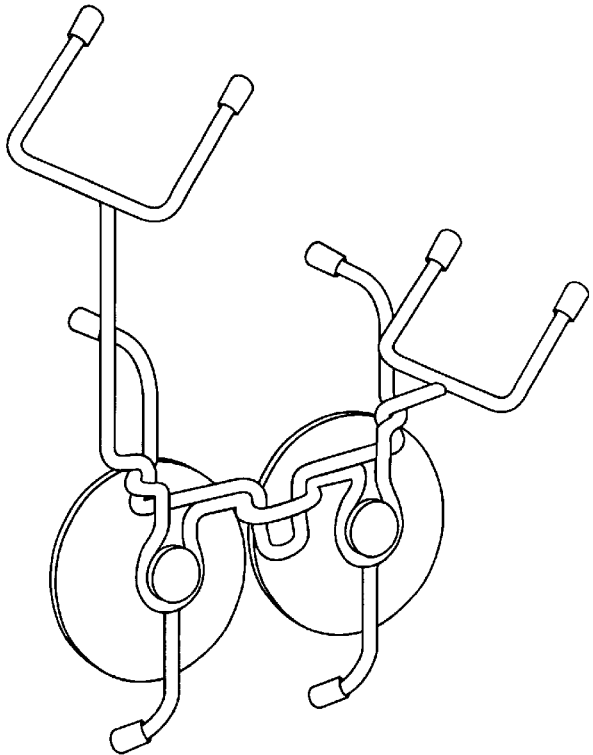
FIG. 9A is a perspective view of the assembled rack shown in FIG. 9.

FIG. 9, shows a perspective exploded view of a sixth embodiment of the invention; a wire formed, in-sink, dual cradle type, dual cup scrubber rack 18F. It resembles scrubber rack 18J, in that a rack frame is wire-formed and has two portions; except a cradle portion 43A is reversible. A base portion 42A having two suction cup 22A, mates with cradle portion 43A; each of whose form, dimension and disposition constitute the scrubber support and positioning device. FIG. 9A shows the assembled two portions joined together.

The right and left halves of base portions 42A are a mirror image of each other wherein the wire is bent to form left cup ring 38A and right cup ring 38B. A stabilizer arm 30D, extends down roughly 4 cm and is coplanarly joined to the lower midpoint each of left cup ring 38A. The lower end of each stabilizer arm 30D is of size and shape similar to that of FIG. 1 with end cap 32. The outer top terminus of left cup ring 38A and of right cup ring 38B extends upward about 1 cm then offsets outward about 0.3 cm and returns above its starting point, forming a left lock hook 44 and a right lock hook 44A. The notch or trough thus formed is to restrain the outward movement of a vertical wire nested in the hook. The upper end of each lock hook continue upward roughly 1 cm then curve inward and upward over about a 90° arc and 2.0 cm radius. This forms a rack support arm 34J generally perpendicular to the vertical face of left cup ring 38A and right cup ring 38B. Each terminus is optionally capped by bumper end cap 32.

The inner upper facing terminus of left cup ring 38A and right cup ring 38B extends upward 1 cm and turns horizontally toward each, then outward and join in a parallel offset some 0.3 cm×1.2 cm long. This forms a center grip 45 midway between left cup ring 38A and right cup ring 38B.

The cradle portion 39 is made up of two identical square-U shaped cradles; a upper cradle 24E and lower cradle 24F whose inside is roughly 3 cm wide×2.8 cm deep. The cradles are perpendicularly joined near the center of their closed ends by a single shaped wire. A portion of this wire between the two cradles is U shaped to form a grip insert 46, some 1 cm deep and wide, chosen to mate into center grip 45.

The upper end of each leg of the U turn away in opposite directions at right angles to form a cradle spacer bar 47. The opposite extremities of cradle spacer bar 47 fold back on themselves over about a 2 mm radius then immediately invert outward with the same radius. The wire is parallel and generally in the same plane as cradle spacer bar 47. This inverse bend forms what appear to be notches opening outward, a left lock notch 48 and a right lock notch 48A, at each of the outer ends of each cradle spacer bar 47. These notches are spaced to and form a tight fit as they lock into their corresponding left lock hook 44 and right lock hook 44A of rack base 42A as shown in FIG. 9A.

The upper end of left lock notch 48 extends vertically some 7 cm to form an upper frame member 26E. The upper 1 cm or so, tilts counterclockwise about 30° to perpendicularly join the center face of the closed end of upper cradle 24E, whose face is tilted some 30° clockwise. The upper end of right lock hook 44A extends horizontally right as a lower frame member 28D to join the center of the face of the closed end of lower cradle 24F whose face is also tilted roughly 30° clockwise.

The rack is then completed by inserting cup mount diameter 40A of rear facing suction cup 22A into each of the cup ring 38

Operation of scrubber rack 18F is identical to operation of scrubber rack 18J of FIG. 8, except in the way cradle portion 43A is mated to the mounted rack base 42A. This if done by placing grip insert 46 of cradle portion 43A to begin entering center grip 45 of rack base 42A. Then, slightly pulling upper cradle 24E and lower cradle 24F toward each other. This moves left lock notch 48 and right lock notch 48A closer together. Then fitting left lock notch 48 and right lock notch 48A into corresponding left lock hook 44 and right lock hook 44A while simultaneously fully sliding grip insert 46 into center grip 45. Then the pressure on the cradles is relieved cradle portion 43A locks tightly into rack base 42A forming the assembled rack shown in FIG. 9A. Additionally, the scrubber rack 18f is ambidextrous and cradle portion 43A may be joined to rack base 42A, with the upper cradle 24E either on the left for right handed users as shown in FIG. 9A or on the right for left handed users. In either case it provides a designated place for parking the scrubber between use and after use all effluents flow into sink interior 112 as shown in FIG. 1B.

Scrubber 100 can then be placed into the scrubber rack 18F of FIG. 9 with scrubbing element 102 either facing up or facing down. In the case where scrubbing element 102 is facing down, handle 102 is raised and scrubbing element 102 is hooked over upper cradle 24E while lowering and releasing handle 102. This causes the lower end of the handle 102 to be slideably supported on lower cradle 24F, until the lower side of attaching frame 105 comes to rest against the closed end of upper cradle 24E. Thus rack 18F is supporting and positioning scrubber 100. Note that in this case the sides of upper cradle 24E are simply constraining handle 102 within upper cradle 24E, but do not support its weight.

In the case where scrubber 100 is supported with scrubbing element 102 facing up, the open ends only of the upper cradle 24E support the lower edges of attaching frame 105 only. Scrubber 100 slides down until the outer sides of the sides upper cradle 24E comes to rest against a catch feature 106 of attaching frame 105. In this mode, scrubber 100 is not supported by the bottom of upper cradle 24E.

It should be noted that, whether scrubber 100 is placed in rack 18F with the scrubbing element up or down, the lower end of handle 102 rests in lower cradle 24F. Thus liquid soap 110 is always down and cannot seep up into elevated sponge 103. More importantly, in either mode, any effluents 101 flowing down from scrubbing element 102 after each use, will flow only into the sink for self-disposal.

Figures 10, 10A:
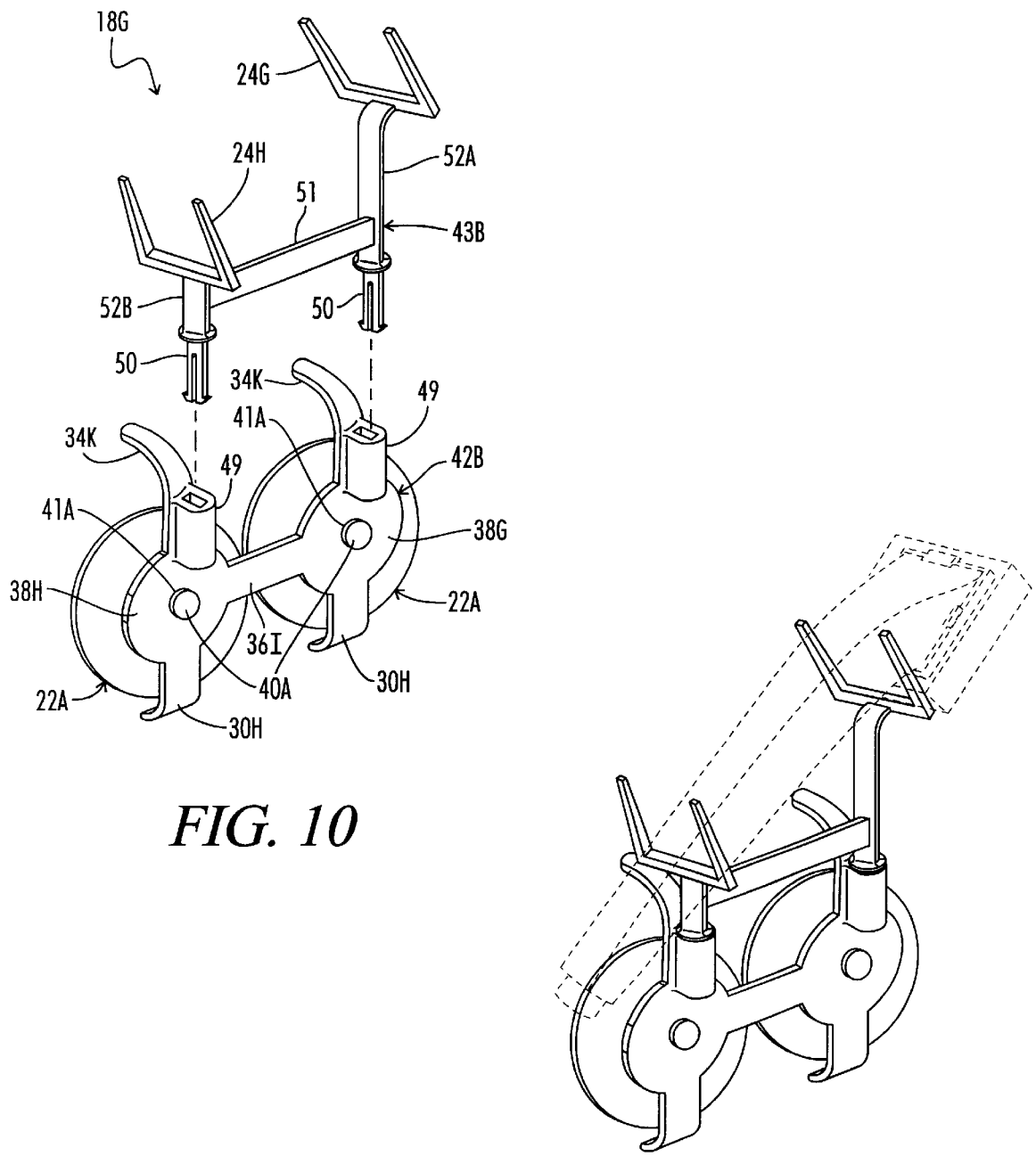
FIG. 10 is a exploded view of a plastic molded frame version of the invention like the one shown in FIG. 9.
FIG. 10A is is a perspective view of the assembled rack shown in FIG. 10.

FIG. 10 is a perspective exploded view of a scrubber rack 18G, which is essentially a plastic version of scrubber rack 18F of FIG. 9. It comprises; a cradle portion 43B, a base portion 42B molded of plastic material identical to that of 18A of FIG. 2 and two of a suction cup 22A and is functionally identical to the wire-formed scrubber rack 18F except in the mating mechanism. The plastic parts generally have a thickness in the order of 2 mm. The form, dimensions and disposition of cradle portion 43B and rack base 42B constitute the scrubber support and positioning device. Rack base 42B consists of two coplanar halves. Each half consists of identical a left cup ring 38H and a right cup ring 38G, roughly 2 cm diameter. Each cup ring is joined at the adjacent mid edges by a cup holder member 36I roughly 0.8 cm high×4.5 cm long. Each of two stabilizer arm 30E roughly 0.8 cm wide extend down for some 3 cm from the mid lower edge of both left cup ring 38H and right cup ring 38G. Each stabilizer arm 30E terminates by turning 90° inward over about a 2 cm radius arc.

The mid upper edges of both left cup ring 38H and right cup ring 38G extend upward to each form a rack support arm 34K, roughly 0.8 cm wide. The first 1 cm length of each rack support arm 34K is straight then curves up and inward over about a 2 cm radius. The width of both rack support arm 34K tapers to roughly 0.6 cm at their terminus. Two of a spade socket 49 roughly 1 cm long similar to those commonly used for electronics applications is joined along its length to the straight outer lower face of each rack support arm 34K. Socket 49 is some 0.5 cm wide, 0.8 cm deep and 1 cm high, with rectangular slot 2 mm wide by 5 mm deep extending vertically through the socket. The vertical axis of each roughly coplanar slot is tilted 11° from the vertical face of coplanar left cup ring 38H and right cup ring 38G. This compensates for the opposite inner slope of the wall of most kitchen sinks.

Cradle portion 43B includes two identical square U-shaped cradles; a lower cradle 24H and a upper cradle 24G. Their opening is about 3 cm wide×2.8 cm deep. The bottom and sides have a cross section of some 2.5×2.5 mm but the sides taper to about 2×2 mm at the open ends. A cradle cross bar 51 has a cross section in the order of 2.5 mm×0.8 mm and 5 cm length and is horizontal. Each end perpendicularly joins the lower end of the wide face of two vertical members; a lower cradle support 52B roughly 1.5 cm long and a upper cradle support 52A roughly 5.5 cm long, whose cross sections are roughly 0.2×0.4 cm. A spade lock jack 50 roughly 1.2 cm long vertically joins the lower end of each cradle support. It has a generally form similar to those commonly used for electronic applications, slotted and dimensioned to snap-lock mate into the corresponding slots in each spade socket 49.

Lower cradle support 52B is roughly 1.5 cm long and the upper end perpendicularly joins the mid bottom face of lower cradle 24H whose face is tilted about 30° counterclockwise from the vertical. The upper 1 cm of upper cradle support 24G, has its face tilted about 60° clockwise to perpendicularly join the mid bottom inner face of upper cradle 26F whose face is tilted 30° counterclockwise.

The rack of FIG. 10 is completed by inserting a cup mount diameter 40A of a suction cup 22a from the side of the two rack support arm 34K into a cup mounting hole 41A.

Operation of scrubber rack 18G is also shown in FIG. 10A, by a phantom view of scrubber 100 of FIG. 1B, held in place. First base portion 42B is attached to a sink in the same manner as base portion 42A of FIG. 9. Then, depending on whether the rack is for a right-handed user or a left-handed user, cradle portion 43B is appropriately reversibly mated to the rack base 42B. This done by simultaneously inserting each spade lock jack 50 into their respective spade socket 49 of rack base 43B, until they lock together. Thus, the rack frame halves are releasably mated together and the mounted rack is used in the same way as the rack of FIG. 9 and with the same advantages.

FIG. 11 is a perspective, exploded view of a seventh embodiment of the invention, a scrubber rack 18H; a plastic, dual cup, multi-plane, ambidextrous, convertible frame, cradle-type rack. It is comprises a cradle portion 43C, a base portion 42C in which two of a suction cup 22A are mounted; each of whose form, dimensions and disposition constitute the scrubber support and positioning device. Cradle portion 43C comprises; a mount channel 52, a lower frame member 28G an upper frame member 26H, and a upper cradle 24J and a lower cradle 24J.

A upper cradle 24I and a lower cradle 24J have the general a square U shape with parallel faces tilted roughly 35° clockwise. Each has a roughly 3 cm wide×2.8 cm deep inside and 4×4 mm cross-section tapering to some 2.5×2.5 mm at the open ends. Lower frame member 28G and upper frame member 26H have rectangular lower cross-sections of roughly 0.5×0.7 cm with the 0.7 cm faces generally vertical. The vertical centerline each cradle opening lies generally in a vertical plane through the centerline of the narrow faces of lower frame member 28G and upper frame member 26H and the the opening of mount channel 52.

About the first 1 cm length of horizontal lower frame member 28G is joined to the top surface at the right end of mount channel 52 and extends outward another roughly 2.5 cm. The last 1 cm of its length tapers to about 4×4 mm and tilts upward to perpendicularly join the bottom center of lower cradle 24J. The lower cross section of upper frame member 26H joins the left end top surface of mount channel 52 and is some 4 cm long and is tilted roughly 35° counterclockwise. The cross section of its upper end also tapers to about 4×4 mm where it perpendicularly joins the mid inner face of the closed end of upper cradle 24I.

Rack base 42C is comprised of a mount bar 53 having a square cross-section and length predetermined to fill the opening of mount channel 52. Each end of mount bar 53, are symmetrically formed into a cup holder member 36E, roughly 3×5 mm cross-section and are coplaner. The center line of their narrow face and center line of the length of horizontal mount bar 53, lie roughly in the vertical plane of mount channel 52. Each cup holder member 36E tilts down and tapers to 2.5×2.5 mm cross-section at the lower end where each lower end joins the inner center edges of a cup ring 38J. Each coplanar cup ring 38J is horizontal and roughly 2.5 mm thick with a 2 cm outside diameter, with a cup hole 41A through its center.

The diameter of cup hole 41A is predetermined to receive a cup mount diameter 40A which are inserted into each cup ring 38J so each cup 22A faces down. The length and tilt angle of each cup holder member 36E is such that it separates center of each cup hole 41A by roughly 6 cm and the top of mount bar 53 is roughly 1.5 cm above the bottom of ring 38J.

A stabilizer arm 30F pair tilt downward and have starting cross-section of about a 2.5×6 mm where each perpendicularly joins each upper end of cup holder member 36E, adjacent to mount bar 53. The extremities of each stabilizer arm 30F have a roughly 2×2 mm cross-section. Each terminates at about a horizontal plane on which the compressed face of the two suction cup 22A mainly lie. This is some 2 cm horizontally from the vertical plane roughly through the top length centerline of mount bar 53.

A rack support arm 34L pair, each about 2.5×3 mm cross-section where each perpendicularly joins cup cup holder member 36E, opposite stabilizer arm 30F at each extremity of mounting bar 53. Each rack support arm down to a 2×2 cm cross-section and slopes about 30° downward and after about 1 cm, curves downward over a 1.9 cm radius for 60° and terminates.

FIG. 11B is an enlarged partial cut away of cradle portion 43C that illustrates the details of a mount channel 52, configured to lockably and releasably mate with mount bar 53 of FIG. 11.

The lower edge of a rear channel wall 54 has a lock channel lip 44A that is a 45° inward and sloping lip, whose inner edge is roughly even with the bottom of the opposing wall, a outer channel wall 55 and reduces the width of opening of mount channel 52 by approximately 0.4 mm. Then return slope of 20° lock channel lip 44A effectively reduces the remaining inner height of rear channel wall 54 only slightly less than an outer channel wall 55. Thus mating mount bar 53 of FIG. 11 into mount channel 52, requires sufficient hand force to cause the lip of rear channel wall 54 to expand the opening of the channel to allow mount bar 53 to enter. After mount bar 53 is inserted, the return 20° slope of lock channel lip 44A snaps back and wedges mount bar 53 upward to effectively locks it in place.

A pry slot 56 in the center of rear channel wall 54 is roughly 1 cm wide and 0.3 cm above lock channel lip 44A. The top surface of slot 56 slopes in about a 30° included angle This allows a knife or a flat screwdriver blade to wedge rear channel wall 54 away to allow removal of mount bar 53, so cradle portion 43C and base portion 42C can be separated when required.

Figure 11E:
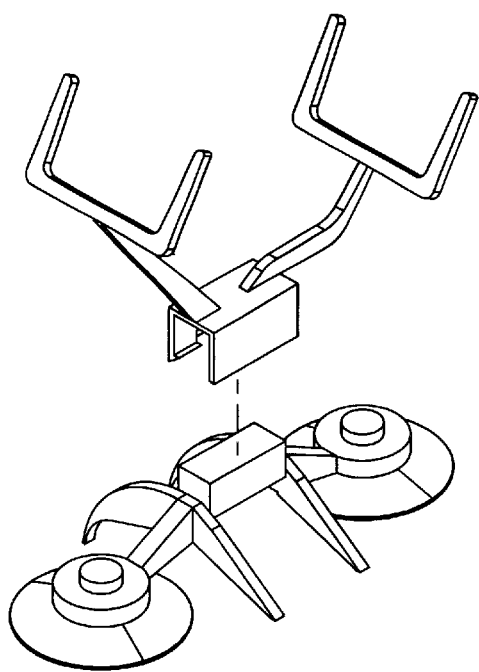
FIG. 11E is an exploded perspective view of the rack of FIG. 11 with the rotatable base portion oriented for attachment to a roughly horizontal sink ledge.

Mount bar 53 can be mated to mount channel 52A so the plane of the two suction cup 22A is approximately vertical as shown in the exploded view of FIG. 11 and in the assembled view of FIG. 11A, and in the end views of FIG. 11C and FIG. 11D. Or they can be mated so the plane of suction cups 22A are horizontal as depicted in the exploded view of FIG. 11E and in the assembled view of FIG. 11F, and views of FIG. 11G and FIG. 11H. The relative positions of upper cradle 24I and lower cradle 24J can also be interchanged as shown in FIG. 11C and FIG. 11D and in FIG. 11G and FIG. 11H to accommodate either a right-handed or left-handed user.

Operation of scrubber rack 18H is started by mating cradle portion 43C with rack base 42C by aligning vertically the two inner side face of mount channel 52 with the two corresponding side faces of bar 53 between the inner side faces of rack support arm 34L. When mount bar 53 is pressed firmly into the opening of the mount channel 52, lock channel lip 44A forces the opening of mount channel 52 to expand until mount bar 53 is fully inserted into the channel. After lock channel lip 44A passes the bottom edge of the mount bar 53, the walls of mount channel 52 snap close. This causes taper lock channel lip 44A to wedge up against the bottom edge of bar 53 locking it firmly into mount channel 52.

The two portions may be separated again by inserting the tip of a knife or flat screwdriver into the opening of pry slot 56 while pulling bar 92 out of the opening. This causes lock channel lip 44A to move away, opening mount channel 52A to release mount bar 53.

It should be noted that scrubber rack 18H can have cradle portion 43C mated to rack base 42C with the plane of the two suction cup 22A approximately vertical as shown in the exploded view of FIG. 11, shown assembled view FIG. 11A, and end views of FIG. 11C and FIG. 11D. This mode is suited for mounting for example, to the inner wall of a kitchen sink. Cradle portion 43C can also be reversed so the relative position of upper cradle 24I can be on the right as in in FIG. 11C, for left handed users; or on the left as in FIG. 11D for right handed users.

Scrubber rack 18H is readied for attachment to the inner sink wall by first moistening the inner face of the two suction cups 22A. Scrubber rack 18H is then held as shown in FIG. 1B with the cups facing the inner sink wall 107 and with the two rack support arm 34L mated roughly with rounded inner sink edge 109. Then the two suction cups 22A are compressed against the vertical sink wall with a slight downward force. This causes the two rack support arm 34L to mate firmly with the curvature of rounded inner sink edge 109 and the tips of the two stabilizers 34L to bear firmly against inner sink wall 107 giving the rack a solid feel to the user. The rack is thus ready for use.

Figure 11F:
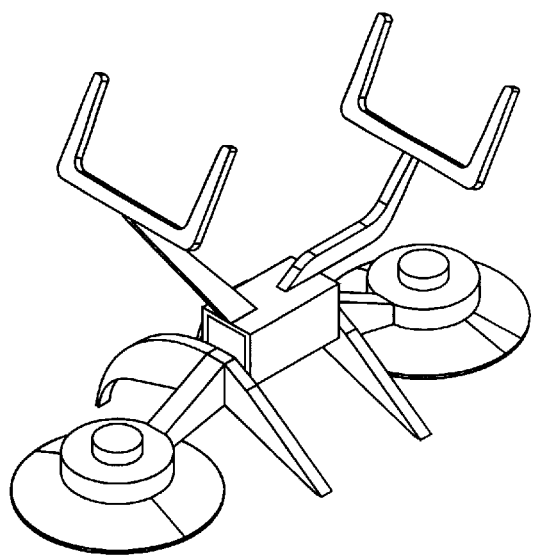
FIG. 11F is a perspective view of the assembled rack of FIG. 11E.
Figure 11G:
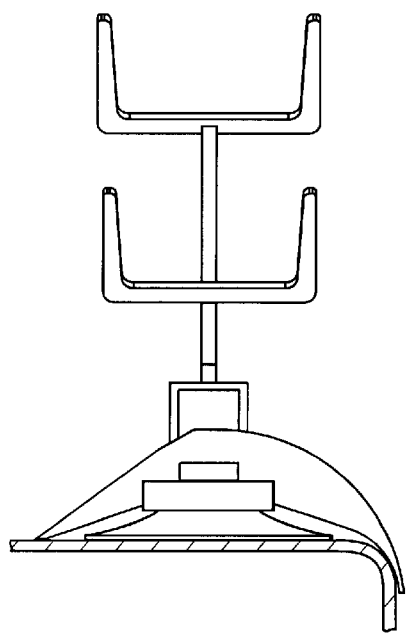
FIG. 11G is an end view of the rack of FIG. 11F attached to a left inner sink ledge with the cradles portion oriented for left-handed users.
Figure 11H:
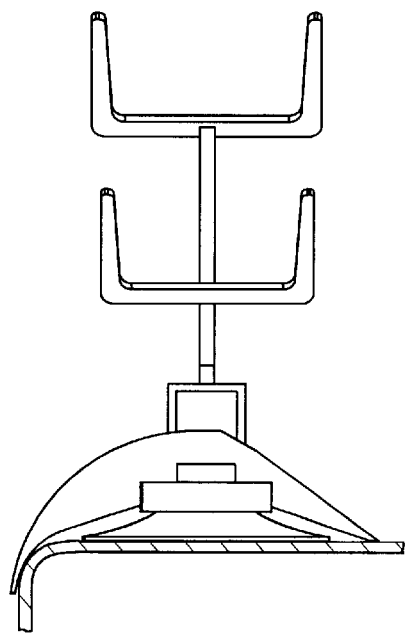
FIG. 11H is an end view of the rack of FIG. 11F attached to a right inner sink ledge with the cradles portion oriented for right-handed users.

Scrubber rack 18H can also have cradle portion 43C mated to rack base 42C so the plane of the two suction cup 22A is horizontal as shown in the exploded view of FIG. 11E, and the assembled view of FIG. 11F, and end views of FIG. 11G and FIG. 11H. This mode is suited for mounting on the top inner ledge of a sink as shown in FIG. 11G and in FIG. 11H. In this case also, cradle portion 43C can also be reversed so the relative position of upper cradle 24I can be on the right as in in FIG. 11G, for left handed users; or on the left as in FIG. 11H for right handed users.

Scrubber rack 18H is readied for horizontal mounting on top sink ledge 108 use by first moistening the inner face of the two suction cups. The rack is then held with the cups facing downward over the selected location with the two rack support arms 34L facing sink interior 112 so they are roughly mated with the curved inner top edge. Then the two suction cups 22A are compressed against the horizontal surface while sliding them away from the sink's opening so the two rack support arms 34L mate firmly with rounded inner sink edge 109 and the tips of the two stabilizers 34L bear firmly against top sink ledge 108 giving the rack a solid feel to the user. The rack is thus ready for use.

In the preferred mode, scrubber rack 18H is assembled and attached to a vertical sink wall, as in FIG. 11A, FIG. 11C and FIG. 11D, so that all effluents will flow only into sink interior 112. After mounting to and inner sink wall, it is be used in the same manner as scrubber rack 18F of FIG. 10 and with the same advantages.

CONCLUSIONS, RAMIFICATIONS AND SCOPE OF INVENTION

Thus it is apparent this scrubber rack invention can have a variety of embodiments. Each embodiment will controllably position the scrubbers in such an attitude that all the water and soap effluents, dripping from the scrubbing element after each use, will flow only into the sink for self disposal and prevent messy puddling. Each embodiment also saves soap by preventing the liquid soap from wastefully seeping into and soaking the sponge while the scrubber is not in use. An important feature is that each embodiment has rack support arms that self-align the rack to its intended position and angular orientation when it is being mounted, then provide the support to keep it there. Thus each version fills the need for an identifiable specific place to park the scrubber.

Further, each scrubber rack embodiment positions the scrubber so the handles are openly and unrestrictedly accessible to the user. This enables either left-handed or right-handed users to freely grasp the scrubber's handle with exactly the same grip as used for scrubbing. Additionally, the various embodiments of the rack frame may be manufactured by low-cost methods such as; molding of plastic materials or fabricating from wire using stainless steel or low carbon steel or other suitable material and finishes.

While the various versions of scrubber racks depicted in FIG. 1 through FIG. 11H show many specificities, these should not be construed as a limitation on the scope of this invention, but rather as an exemplification of some possible embodiments thereof. It should also be obviously evident that each version can have multiple alternative configurations that still embody the essence of this invention.

An example of another embodiment is a ladle-shaped cup-type scrubber rack with a vertical Y-shaped yoke handle whose upper ends curve inward. Such that when a scrubber is placed with the capped end into the cup, it will self center the scrubber's scrubbing element overhanging the center yoke of the Y curve. Another example of is that all or portions of each frame may be formed by die stamping from a sheet of suitable material or die casting, instead of forming in wire or molding in plastic. Obviously then, there are many more versions wherein the novel features of this invention can be embodied.

This invention will provide a variety of inexpensive racks for parking dishwashing scrubbers that can be attached to a sink within convenient and easy reach of an individual user to provide an identifiable specific place for the scrubber. Each embodiment of the rack can be easily mounted by any person, without specialized knowledge or tools. Finally, these racks will promote the use of these dish-washing scrubbers because they eliminate the malady of messy puddles, inefficient use of liquid soap and messy scrubbers. Eliminating the messiness associated with these scrubbers enables the user to enjoy the otherwise manifold benefits of these low-cost scrubbing devices.

Even further advantages of this invention will become apparent from a consideration of the preceding drawings and descriptions. Accordingly, the scope of the invention should be determined not by the embodiments illustrated, but by the appended claims and their legal equivalents.

I claim:

1. A rack sized and shaped for use in a sink having a horizontal peripheral flange and walls depending therefrom defining a basin, said rack further adapted for holding a dish washing scrubber of a type having a scrubbing element and a reservoir of fluid communicating with said element for wetting said element when said element is positioned lower than said reservoir, the improvement comprising:

a frame having a scrubber side and an attachment side;

a cradle disposed on said scrubber side of said frame having upwardly extending parallel arms connected by a crossbar, said cradle being adapted for holding said scrubber, so that said scrubber element is positioned higher than said reservoir;

a suction cup disposed on said attachment side of said frame capable of attaching said rack to said wall of said sink, a pair of arms extending substantially orthogonally from said attachment side of said frame above said suction cup, capable of suspending said rack from said flange of said sink when said rack is attached to said wall thereof;

a pair of stabilizer feet disposed on said attachment side of said frame below said suction cup, said stabilizer feet capable of abutting said wall of said sink to stabilize said rack when said rack is attached to said wall.

2. A rack adapted for attachment to a planar surface for holding a dish washing scrubber, said rack comprising:

a frame having a scrubber side and an attachment side, said frame including a pair of spaced apart parallel frame members, connected by a flexible transverse member, said transverse member adapted to be deflected toward said planar surface when said rack is attached thereto;

a suction cup disposed on said transverse member on said attachment side of said frame, said suction cup adapted for attaching said rack to said planar surface;

a cradle disposed on said scrubber side of said frame having upwardly extending parallel arms connected by a crossbar, said cradle adapted for holding said scrubber;

at least one arm extending from one end of said attachment side of said frame, said at least one arm adapted to abut said planar surface to support said one end of said frame thereagainst when said rack is attached to said planar surface;

at least one stabilizer foot extending from said attachment side of said frame on the end opposite said one end, adapted to abut said planar surface and support said frame when said rack is attached to said planar surface;

said at least one arm, said suction cup and said at least one stabilizer foot extending from said frame in substantially parallel relation, said at least one arm and said at least one stabilizer foot extending farther from said frame than said suction cup, whereby deflection of said transverse member enables said suction cup to contact said planar surface to attach said rack thereto.

3. A method for attaching a utility rack for holding a handheld implement to a kitchen sink, comprising the steps of:

providing a sink having a horizontal peripheral flange and walls depending therefrom defining a basin;

providing a rack having a first and second side, and means for holding said implement;

providing a pair of arms extending substantially orthogonally from said second side of said rack which engage said flange to suspend said rack therefrom;

providing a pair of stabilizer feet disposed on said second side of said rack which abut said wall when said rack is attached thereto;

providing a suction cup disposed on said second side of said rack, intermediate said arms and said stabilizer feet, which attaches said rack to said wall of said sink.

4. A rack for holding a dish washing scrubber sized and shaped for use in a sink having a horizontal peripheral flange and walls depending therefrom defining a basin, the rack comprising:

a frame having a scrubber side and an attachment side;

a cradle disposed on said scrubber side having upwardly extending parallel arms connected by a crossbar, said cradle adapted for holding said scrubber;

a suction cup disposed on said attachment side of said frame capable of attaching said rack to said wall of said sink;

at least one arm extending substantially orthogonally from said attachment side of said frame above said suction cup, said at least one arm adapted for suspending said rack from said flange of said sink when said rack is attached to said wall thereof;

at least one stabilizer foot disposed on said attachment side of said frame below said suction cup, said stabilizer foot capable of abutting said wall of said sink to stabilize said rack when said rack is attached to said wall.

* * * * *

UNITED STATES PATENT AND TRADEMARK OFFICE
CERTIFICATE OF CORRECTION

PATENT NO.    : 6,331,191 B1
DATED         : December 18, 2001
INVENTOR(S)   : Chobotov, M.

It is certified that error appears in the above-identified patent and that said Letters Patent is hereby corrected as shown below:

Column 8,
Lines 42-45, please replace claim 10 with the following:
-- 10.  The method of claim 9 wherein an inner most thin wall graft member extends longitudinally beyond the other thin wall graft member or members and engages the patient's body lumen directly. --

Signed and Sealed this

Thirteenth Day of August, 2002

*Attest:*

JAMES E. ROGAN
*Attesting Officer*        *Director of the United States Patent and Trademark Office*